United States Patent
Higuchi

(10) Patent No.: US 8,126,444 B2
(45) Date of Patent: Feb. 28, 2012

(54) COMMUNICATION SYSTEM AND METHOD FOR EXECUTING APPLICATION PROGRAM THAT SPECIFIES NO COMMUNICATION PARAMETER

(75) Inventor: Naoshi Higuchi, Tokyo (JP)

(73) Assignee: NEC Corporation, Tokyo (JP)

(*) Notice: Subject to any disclaimer, the term of this patent is extended or adjusted under 35 U.S.C. 154(b) by 690 days.

(21) Appl. No.: 11/523,584

(22) Filed: Sep. 20, 2006

(65) Prior Publication Data

US 2007/0066294 A1  Mar. 22, 2007

(30) Foreign Application Priority Data

Sep. 21, 2005  (JP) .................................. 2005-274142

(51) Int. Cl.
*H04M 3/00* (2006.01)

(52) U.S. Cl. ........ 455/418; 455/419; 370/329; 370/431; 370/432

(58) Field of Classification Search .................. 455/418, 455/419, 450
See application file for complete search history.

(56) References Cited

U.S. PATENT DOCUMENTS

| 2002/0178265 A1* | 11/2002 | Aiken et al. | 709/227 |
| 2002/0178268 A1* | 11/2002 | Aiken et al. | 709/228 |
| 2003/0061613 A1* | 3/2003 | Inose | 725/68 |
| 2004/0081193 A1* | 4/2004 | Forest et al. | 370/458 |

FOREIGN PATENT DOCUMENTS

| JP | 62-222347 (A) | 9/1987 |
| JP | 5-2543 (A) | 1/1993 |
| JP | 6-324978 (A) | 11/1994 |
| JP | 9-282255 (A) | 10/1997 |
| JP | 2004-078507 | 3/2004 |
| JP | 2005-252537 (A) | 9/2005 |

OTHER PUBLICATIONS

Sacable TCP—Kelly.*
International Search Report.

* cited by examiner

Primary Examiner — Wayne Cai
(74) Attorney, Agent, or Firm — Foley & Lardner LLP

(57) ABSTRACT

In a TCP/UDP communication system, a communication process begins with a receipt of a communication request from an application program that does not specify a predetermined communication parameter such as source port number. A port number is dynamically assigned to the communication request. The communication process is then suspended and communication control data associated with the application program is supplemented with the assigned source port number to generate supplemented communication control data. The communication process is then resumed to establish communication over a communications network, and the established communication is controlled according to the supplemented communication control data.

29 Claims, 10 Drawing Sheets

COMMUNICATION SYSTEM AND METHOD FOR EXECUTING APPLICATION PROGRAM THAT SPECIFIES NO COMMUNICATION PARAMETER

BACKGROUND OF THE INVENTION

1. Field of the Invention

The present invention relates generally to communication systems and more specifically to a communication system and method for executing an application program that does not specify a predetermined communication parameter such as source port number.

2. Description of the Related Art

An application execution environment is composed of a CPU, an Operating System (OS) and middleware to execute an application program, such as client's software, server's software and peer-to-peer software. In a prior art application execution environment that executes an application program for internet communication, it is necessary to map a source port number to TCP/IP or UDP/IP communication control data that is uniquely associated with the application program before communication control (bandwidth allocation, data transfer and communication shutoff) is performed. Some application programs explicitly specify the source port number to the application execution environment before a TCP/IP or UDP/IP communication is established. If such an application program is executed in combination with one or more other application programs, an undesirable situation can occur as a result of a single source port number being coincidentally used by more than one application program. To avoid this it is recommended that application programs be written not to specify a source port number. As a result, if communication control such as "firewall" is performed using an application program that does not specify a source port number, the source port number must be dynamically assigned, as described in Japanese Patent Publication 2004-78507. However, the TCP/UDP communication control data cannot be maintained in the application execution environment for all application programs since the communication environment for all application programs since the communication control data is uniquely associated with each application program and since the source port number is not determined beforehand. One solution would be to write an application program that specifies a source port number at the instant it issues a communication request. However, writing such an application is a difficult task.

SUMMARY OF THE INVENTION

In order to eliminate the need to modify application programs, the present invention has the object of providing a communication system and method capable of presetting communication control data into an application execution environment even if the latter has the ability to dynamically assign a source port number (i.e., a predetermined communication parameter) prior to the establishment of communication such as connection setup procedure according to the TCP/IP protocol or transmission of a packet according to the UDP/IP protocol.

According to the general aspect of the present invention, there is provided a communication system comprising communication setup means that initiates a communication process according to a communication protocol in response to a communication request from the application program and suspends the communication process, the application program not specifying a predetermined communication parameter, assignment means that dynamically assigns a communication parameter as the predetermined communication parameter to the communication request, supplement means that supplements communication control data associated with the application program with the assigned communication parameter to generate supplemented communication control data during the time the communication process is suspended, and communication control means arranged to be set with the supplemented communication control data from the supplement means. The communication setup means resumes the communication process when the communication control means is set with the control data to establish communication over a communications network, and the communication control means performs control on the established communication according to the supplemented communication control data.

According to a first aspect, the present invention provides a communication system comprising communication setup means that initiates a communication process according to a communication protocol in response to a communication request from the application program which does not specify a predetermined communication parameter, assignment means that dynamically assigns a communication parameter as the predetermined communication parameter to the communication request, hook means that causes the communication setup means to suspend the communication process in response to the communication parameter being assigned to the communication request, supplement means that supplements communication control data associated with the application program with the assigned communication parameter to generate supplemented communication control data when the communication process is being suspended, and communication control means arranged to be set with the supplemented communication control data from the supplement means. The hook means causes the communication setup means to resume the communication process when the communication control means is set with the control data to establish communication over a communications network, and the communication control means performs control on the established communication according to the supplemented communication control data.

According to a second aspect, the present invention provides communication system comprising at least one computer system and a server connected to the at least one computer system. The at least one computer system comprises communication setup means that initiates a communication process according to a communication protocol in response to a communication request from the application program and suspends the communication process, the application program no specifying a predetermined communication parameter, and assignment means that dynamically assigns a communication parameter as the predetermined communication parameter to the communication request. The server comprises supplement means that receives the assigned communication parameter from the at least one computer system and supplements communication control data corresponding to the application program with the received communication parameter, and communication control means arranged to be set with the supplemented communication control data from the supplement means. The communication setup means of the at least one computer system resumes the communication process when the communication control means is set with the control data to establish communication over a communications network, and the communication control means of the server performs control on the established communication according to the supplemented communication control data.

According to a third aspect, the present invention provides a communication system comprising at least one computer system and a server connected to the at least one computer system. The at least one computer system comprises communication setup means that initiates a communication process according to a communication protocol in response to a communication request from the application program and suspends the communication process, the application program not specifying a predetermined communication parameter, assignment means that dynamically assigns a communication parameter as the predetermined communication parameter to the communication request, and identity decision means that determines the hardware identity of the first computer system and the application identity of the application program of the first computer system. The server comprises a memory that stores at least one communication control data, search means that uses the hardware and application identities determined by the at least one computer system as search keys to make a search through the memory for detecting corresponding communication control data, supplement means that receives the hardware and application identities and the assigned communication parameter from the at least one computer system and supplements the detected communication control data with the received communication parameter if the hardware and application identities received with the communication parameter are matched to the hardware and application identities that correspond to the detected communication control data, and communication control means arranged to be set with the supplemented communication control data from the supplement means. The communication setup means of the at least one computer system that is identified by the matched hardware identity resumes the communication process when the communication control means is set with the control data to establish communication over a communications network, and the communication control means of the server performs control on the established communication according to the supplemented communication control data.

According to a fourth aspect, the present invention provides a method of communication, comprising the steps of initiating a communication process according to a communication protocol in response to a communication request from an application program that does not specify a predetermined communication parameter, dynamically assigning a communication parameter as the predetermined communication parameter to the communication request, suspending the communication process, supplementing communication control data associated with the application program with the assigned communication parameter to generate supplemented communication control data, resuming the communication process to establish communication over a communications network, and controlling the established communication according to the supplemented communication control data.

According to a fifth aspect, the present invention provides a method of communication for at least one computer system and a server connected to the at least one computer system, the method comprising the steps of initiating a communication process in the at least one computer system according to a communication protocol in response to a communication request from the application program which does not specify a predetermined communication parameter, suspending, in the at least one computer system, the communication process, dynamically assigning, in the at least one computer system, a communication parameter as the predetermined communication parameter to the communication request, determining, in the at least one computer system, the hardware identity of the at least one computer system and the application identity of the application program of the at least one computer system, making a search, in the server, through at least one communication control data by using the hardware and application identities determined by at least one computer system as search keys for detecting corresponding control data, receiving, at the server, the hardware and application identities and the communication parameter from the at least one computer system and supplementing the detected communication control data with the received communication parameter if the hardware and application identities received with the communication parameter are identical to the hardware and application identities that correspond to the detected control data, resuming, in the at least one computer system, the communication process to establish communication over a communications network, and controlling, in the server, the established communication according to the supplemented communication control data.

According to a sixth aspect, the present invention provides a method of communication for at least one computer system and a server connected to the at least one computer system, the method comprising the steps of initiating (a) a communication process in the at least one computer system according to a communication protocol in response to a communication request from the application program which does not specify a predetermined communication parameter, (b) suspending, in the at least one computer system, the communication process, (c) dynamically assigning, in the at least one computer system, a communication parameter as the predetermined communication parameter to the communication request, (d) determining in the at least one computer system, the hardware identity of the at least one computer system and the application identity of the application program of the at least one computer system, (e) receiving, at the server, the hardware and application identities determined by step (d) from any of the computer systems and making a search through a plurality of communication control data for detecting communication control data that corresponds to the received hardware and application identities, (f) receiving, at the server, the communication parameter assigned by step (c) and the hardware and application identities determined by step (d) from the at least one computer system and supplementing the communication control data detected by step (e) with the communication parameter if the hardware and application identities received with the communication parameter are matched to the hardware and application identities that correspond to the detected control data, (g) resuming, in the at least one computer system that is identified by the matched hardware identity, the communication process to establish communication over a communications network, and (h) controlling, in the server, the established communication according to the supplemented communication control data.

BRIEF DESCRIPTION OF THE DRAWINGS

The present invention will be described in detail with reference to the following drawings, in which.

DETAILED DESCRIPTION

Figure 1:
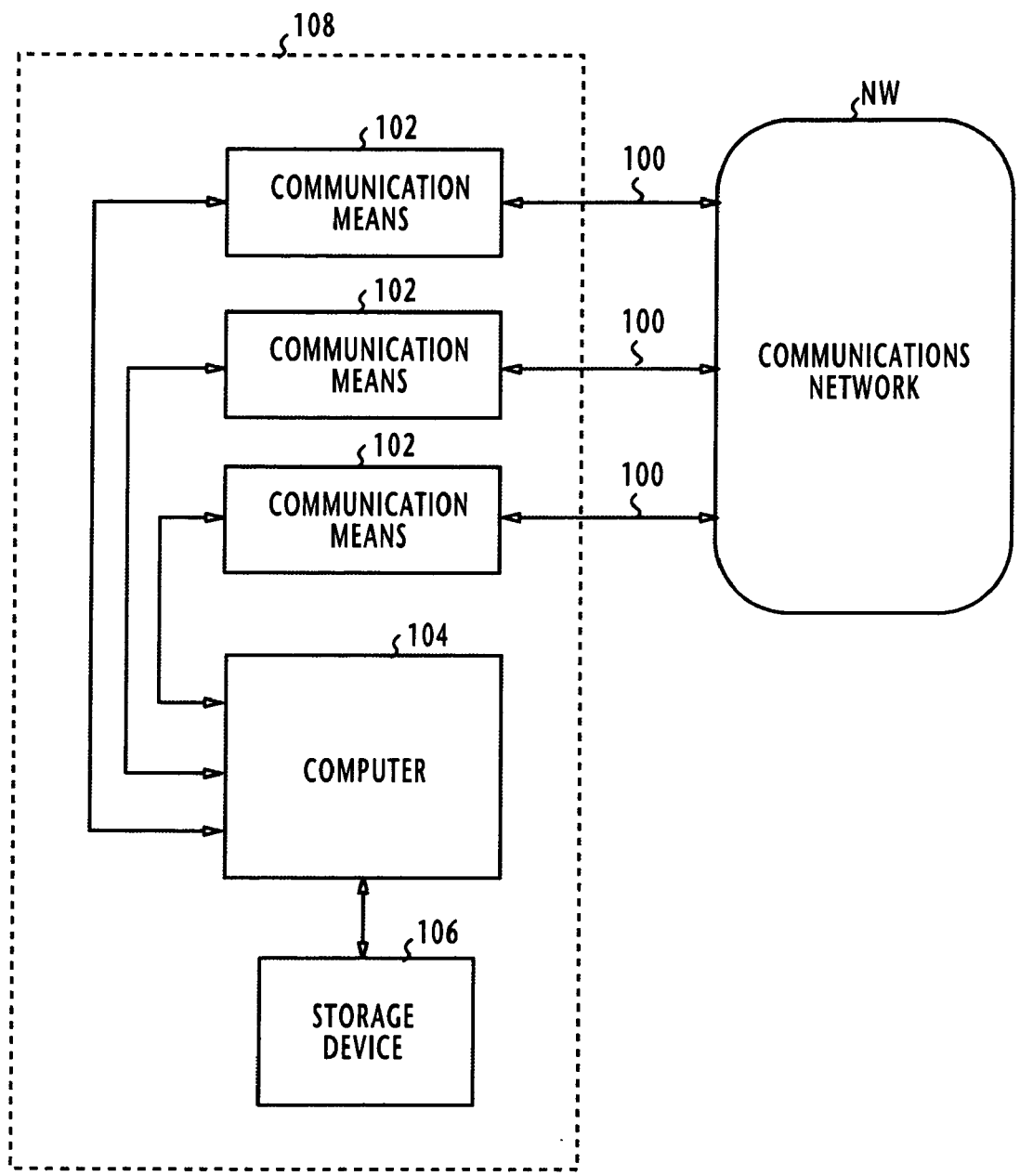
FIG. 1 is a schematic block diagram of a communication system of the present invention.

Referring now to FIG. 1, there is shown a communication system of the present invention, which comprises a computer system 108 encased in a single housing. The computer system includes at least one communication means 102 connected through wireless or wireline channels 100 to a communications network NW or an IP network. A computer 104 is connected to the communication means 102 to operate on an Operating System and to a storage device 106 in which data and/or software programs are stored.

Figure 2:
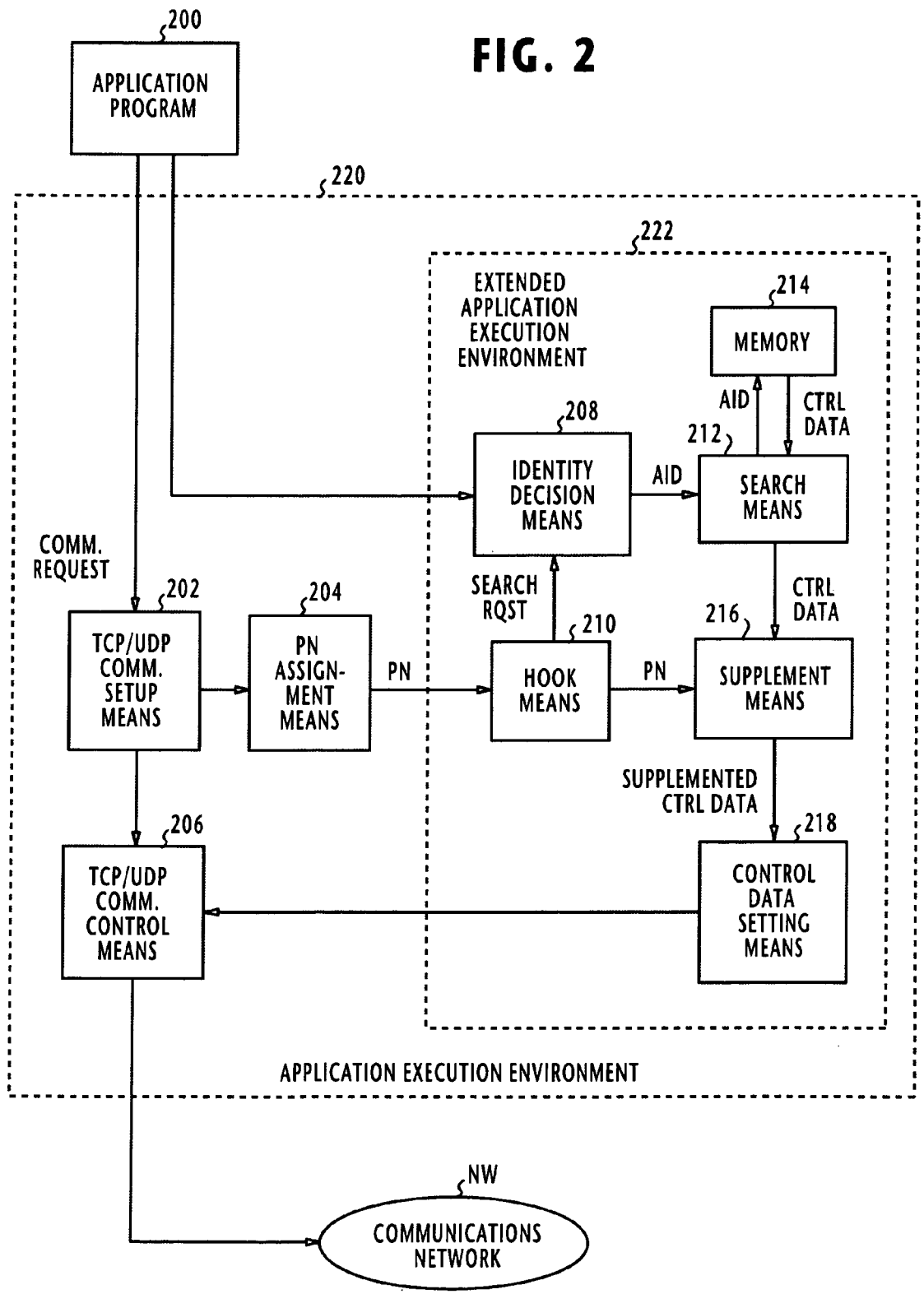
FIG. 2 is a functional block diagram of the communication system of FIG. 1, which is implemented by operating the software of a first embodiment of the present invention.

FIG. 2 is an illustration of functional blocks of a first embodiment of the present invention represented by a system of interconnected functional blocks that executes the Operating System, the middleware and an application program, using the hardware of FIG. 1. The system is represented by an application execution environment 220 indicated by a dotted rectangle, and includes a TCP/UDP communication setup means 202, a source port number (or communication parameter) assignment means 204 and a TCP/UDP communication control means 206 that is connected between the communication setup means 202 and the communications network NW. TCP/UDP communication setup means 202 is connected to an application program 200 that contains programmed instructions for data communication. In response to a user's communication request from the application program, requesting the establishment of a TCP/IP or UDP/IP communication with a remote terminal via the network NW, the communication setup means 202 initiates a communication process according to the TCP/IP or UDP/IP protocol. Application program 200 co-operates with the communication setup means 202 to establish communication to the network via the TCP/UDP communication control means 206.

Further included in the environment 220 is an extended application execution environment 222. The environment 222 is an extended part of the environment 220 and operates during the time the communication setup means 202 is "hooked" in a manner described below in order to intervene its communication process.

As a part of its communication process, the communication setup means 202 calls the source port number assignment means 204 to dynamically assign a source port number to the communication request from the application program 200. The dynamically assigned port number (PN) is supplied to the extended application environment 222. Note that in the present invention the application program 200 never specifies a source port number.

TCP/UDP communication control means 206 receives communication control data from the extended application execution environment 222 to perform a number of control functions, which include bandwidth assignment, transfer of packets and shutoff of communication, for example.

Extended application execution environment 222 is comprised of an identity decision means 208 that determines the identity of the file name of application program 200 and a hook means 210 that receives the assigned source port number from the assignment means 204 and stores the received port number in memory for later use.

Hook means 210 is installed as a software module, or "CALL function" on the extended application execution environment 222. The operation of this CALL function starts with the process of communication setup means 202 and proceeds through the assignment means 204 to the hook means 210. In response to the assignment of the source port number, the hook means 210 is called and the CALL function suspends the communication process that has been initiated by the communication setup means 202 in response to receipt of the communication request from the application program 200. At the same time, the hook means 210 supplies a search request to the identity decision means 208, receives the assigned port number and hands it to a supplement means 216. As a result, the CALL function of the hook means 210 proceeds to the supplement means 216.

In response to the search request from the hook means 210, the identity decision means 208 determines the identity of application program 200 by using its file name and supplies the application identity (AID) of the program 200 to a search means 212. Using the AID as a search key, the search means 212 makes a search through a memory or lookup table 214 in which a number of application identities (AIDS) are mapped to a number of communication control data in a one-to-one or one-to-many correspondence for detecting control data that corresponds to the AID of application program 200 currently being used.

Supplement means 216 receives the communication control data associated with the application program 200 from the search means 212. Since this control data has no information on the source port number, the supplement means 216 supplements the control data with the source port number received from the hook means 210 to produce supplemented communication control data. The CALL function of the hook means 210 proceeds to a control data setting means 218.

Control data setting means 218 receives the supplemented communication control data from the supplement means 216 and sets the received data into the TCP/UDP communication control means 206. When this occurs, the CALL function of hook means 210 returns from the process of data setting means 218 through the processes of supplement means 216 back to the hook means 210 and thence to the assignment means 204 to the communication setup means 202 in order to resume its communication process. Thus, packets are formulated and forwarded according to the TCP/IP or UDP/IP protocol to the network through the communication control means 206.

Figure 3:
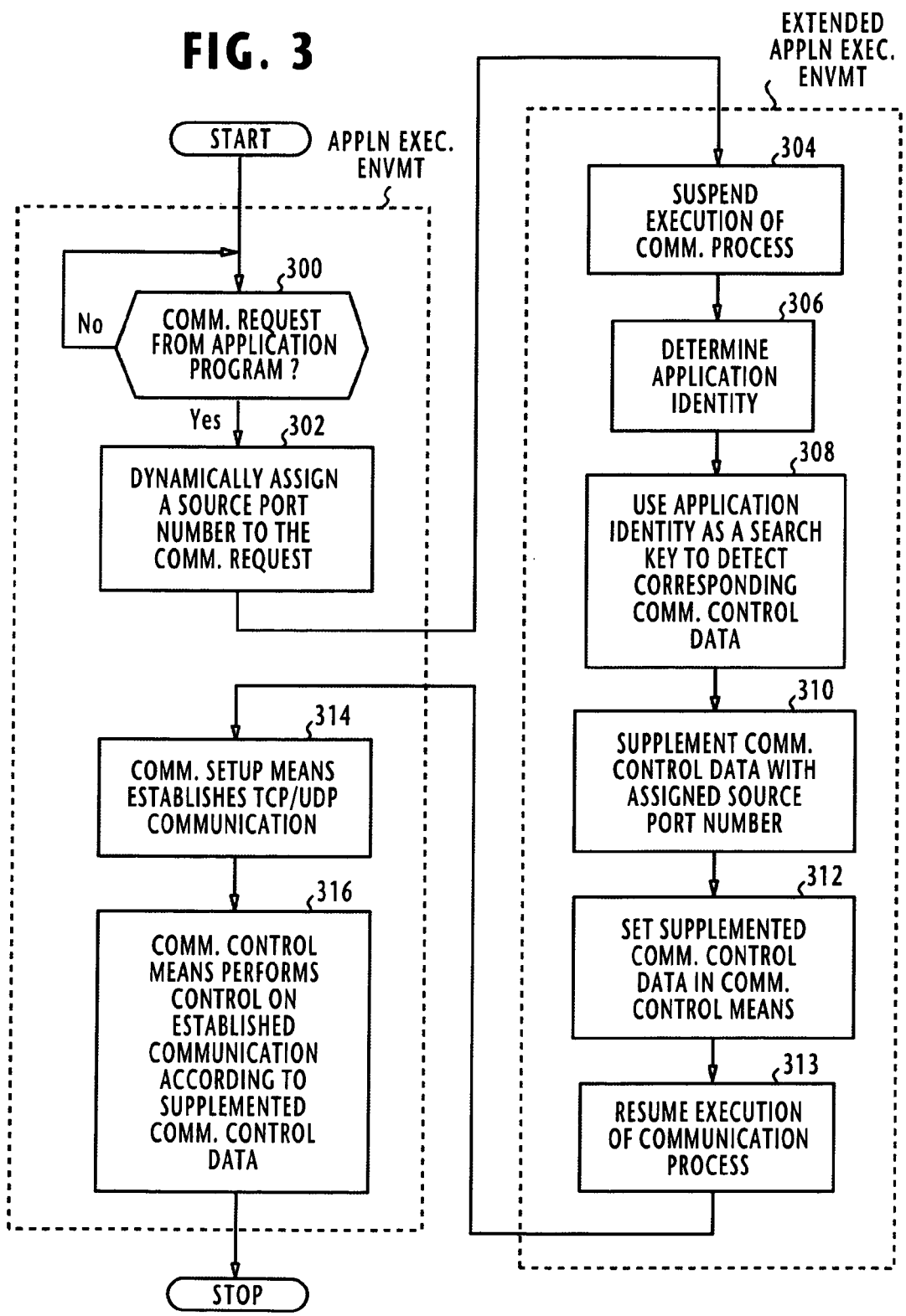
FIG. 3 is a flowchart representing a software implementation of the communication system of the first embodiment.

FIG. 3 is an illustration of a software implementation of the communication system of the present invention represented by a flowchart whose routine is broadly divided into a first subroutine executed by the application execution environment 220 and a second subroutine executed by the extended application execution environment 222.

In the first subroutine, a communication process is initiated by the communication setup means 202. The communication process begins with decision step 300 to determine whether a user's TCP/UDP communication request is issued from the application program 200, which specifies no source port number as described above. If a communication request is issued from the application program 200, flow proceeds to step 302 to dynamically assign a source port number, as a part of the communication process, to the communication request, and flow exits the first subroutine and enters the second subroutine.

The second subroutine begins with step 304 to suspend the execution of the communication process initiated by the communication setup means 202 in the first subroutine. At step 306, the identity AID of application program 200 is determined, and the determined AID is used as a search key to search through the lookup table 214 for detecting the communication control data corresponding to the application program 200 (step 308). At step 310, the communication control data associated with the program 200 is supplemented with the source port number assigned at step 302, and the supplemented control data is set into the communication control means 206 (step 312). At step 313, the execution of the communication process by the communication setup means 202 is resumed, with flow leaving the second subroutine to return to the first subroutine.

In the first subroutine, the communication setup means 202 is activated, at step 314, to resume its communication process in which packets are formulated and forwarded onto the network through the communication control means 206 according to the TCP/IP or UDP/IP protocol. At step 316, the communication control means 206 performs control on the forwarded packets according to the control data already set in step 312.

As described above with reference to FIGS. 2 and 3, the operation of extended application execution environment 222 begins with the assignment of a source port number to a user's communication request by the assignment means 204 and ends with the setting of communication control data into the communication control means 206. Since the control data set in the control means 206 is supplemented with the source port number dynamically assigned by the assignment means 204, the present invention allows communication control data to be written in advance of the receipt of a communication request from an application program of the type which does not explicitly specifies a source port number. As a result, the only function needs to be performed by the application program 200 is to request the communication setup means 202 to establish a TCP or UDP communication.

Figure 4:
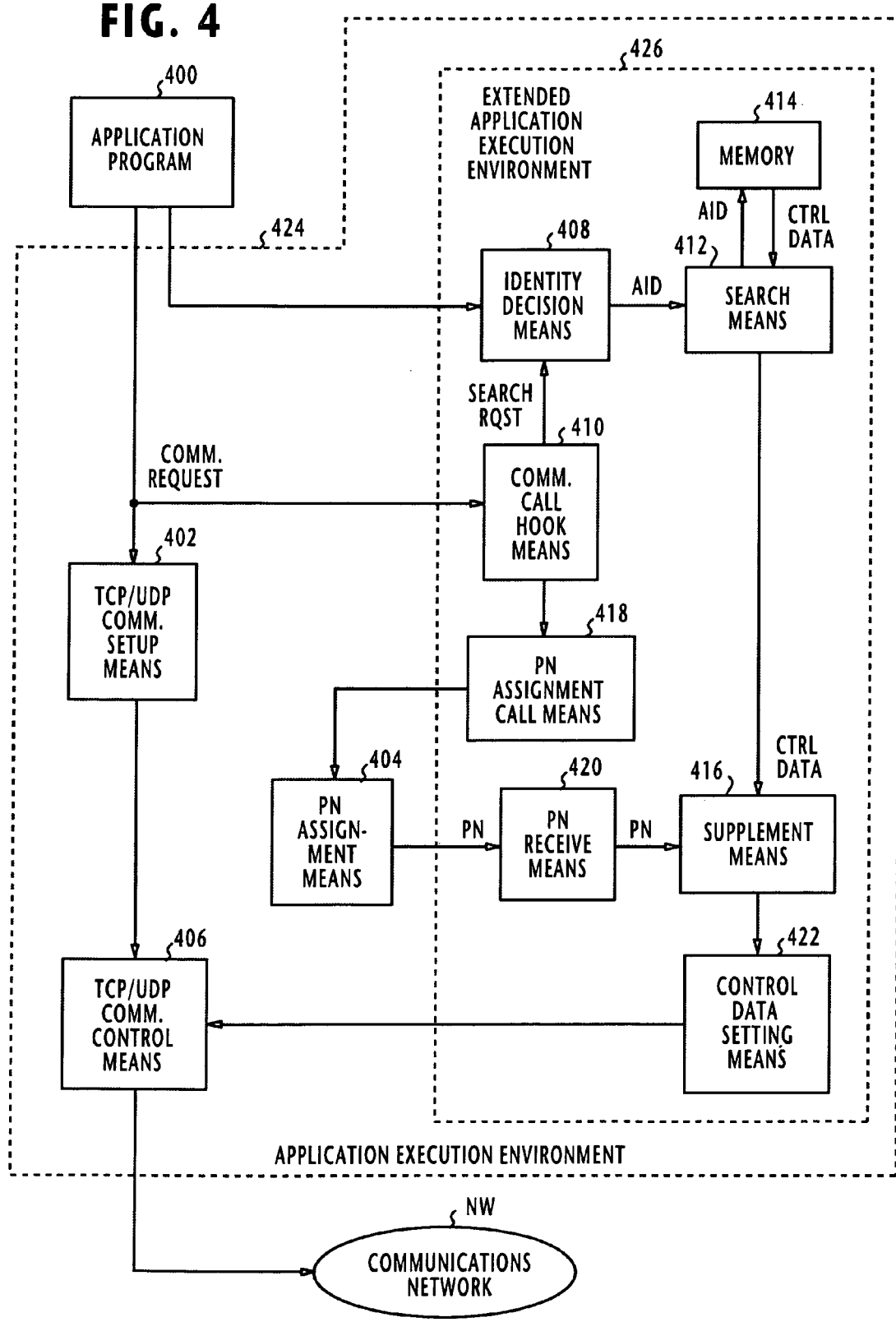
FIG. 4 is a functional block diagram of the communication system of FIG. 1 which is implemented by operating the software of a second embodiment of the present invention.

FIG. 4 is an illustration of a system of interconnected functional blocks that executes the Operating System, the middleware and an application program using the hardware of FIG. 1 according to a second embodiment of the present invention. The system is represented by an application execution environment 424, and includes a TCP/UDP communication setup means 402, a source port number assignment means 404 and a TCP/UDP communication control means 406 that is connected between the communication setup means 402 and the communications network NW. TCP/UDP communication setup means 402 is connected to an application program 400 that specifies no source port number. Communication setup means 402 initiates a communication process according to the TCP/IP or UDP/IP protocol in response to a user's communication request from the application program, in the same manner as that performed in the first embodiment. Thus, the application program 400 co-operates with the TCP/UDP communication means 402 to set up a communication to the network via the TCP/UDP communication control means 406.

Similar to the previous embodiment, the application execution environment 424 includes an extended application execution environment 426, which operates during the time the communication means 402 is hooked in a manner described below.

Extended application execution environment 426 is comprised of an identity decision means 408 that determines the identity of application program 400 and a communication call hook means 410 that receives a communication request from the application program 400.

Similar to the previous embodiment, the communication call hook means 410 is installed as a "CALL function" software module on the extended application execution environment 426. The operation of this CALL function starts with the process of communication setup means 402 and proceeds to the hook means 410.

In response to receipt of the communication request, the CALL function of the hook means 410 suspends the execution of a communication process, which would otherwise be initiated in the communication setup means 402 in response to receipt of the communication request from the application program 400. Simultaneously, the hook means 410 supplies a search request to the identity decision means 408 and the CALL function of hook means 410 proceeds to a source port number assignment call means 418 that calls the port number assignment means 404.

Meanwhile, the identity decision means 408 responds to the search request from the hook means 410 to determine the AID of application program 400 and supplies the determined AID to a search means 412. Using the AID as a search key, the search means 412 searches through a lookup table 414 for detecting communication control data that corresponds to the AID of application program 400 and supplies the detected control data to a supplement means 416.

Meanwhile, the PN assignment call means 418 calls the PN assignment means 404 to dynamically assign a source port number to the communication request and supplies the assigned port number to a port number receive means 420, which receives and supplies the assigned source port number to the supplement means 416. Supplement means 416 supplements the control data received from the search means 412 with the source port number to produce supplemented communication control data. The supplemented communication control data is supplied to a control data setting means 422, which sets the supplemented control data into the communication control means 406. By the time the supplemented control data is set into the communication control means 406 by the data setting means 422, the CALL function of the hook means 410 has proceeded through the means 418, 404, 420, 416 and 422, and now returns to the communication setup means 402 to resume its communication process.

Figure 5:
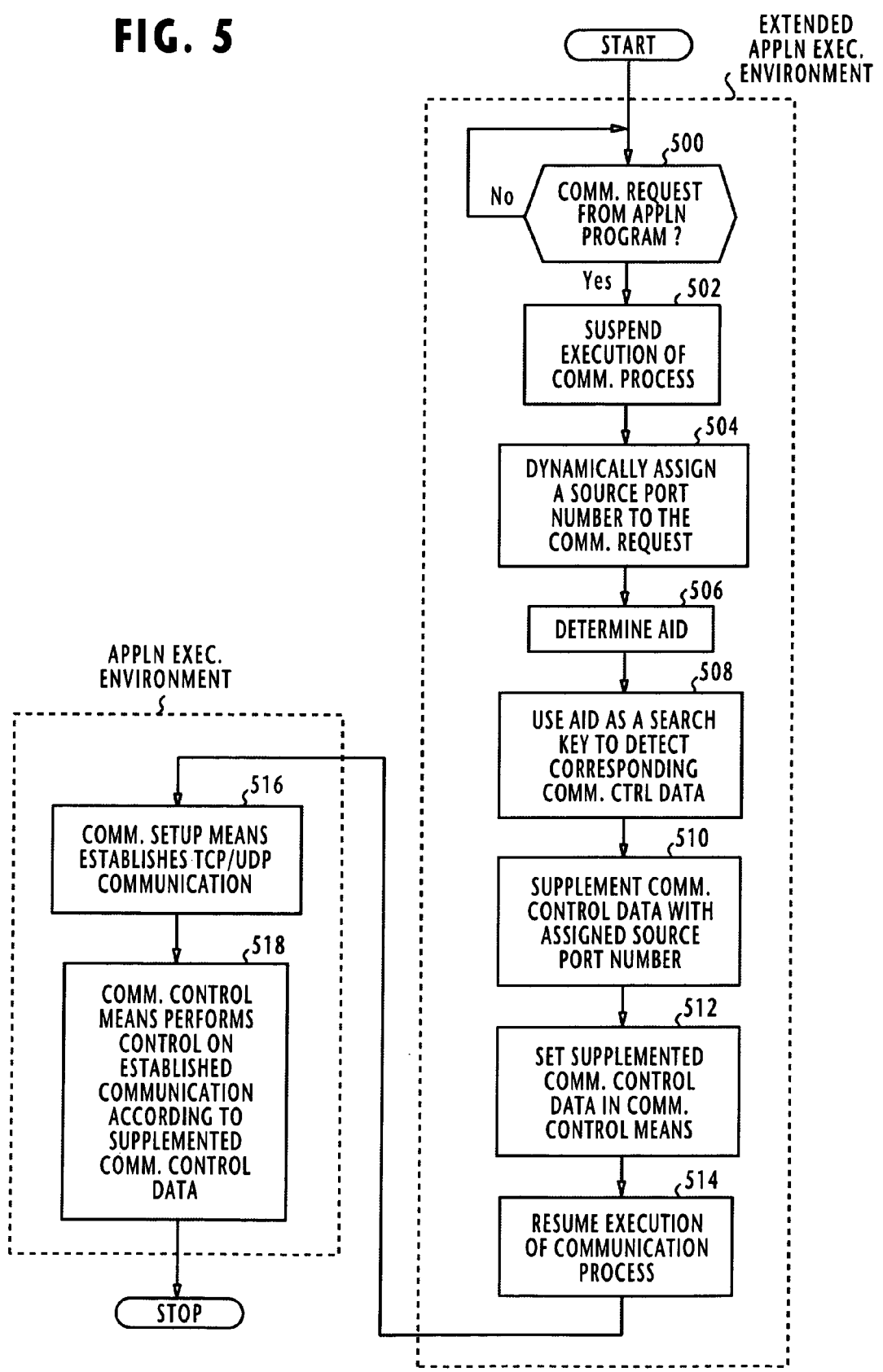
FIG. 5 is a flowchart representing a software implementation of the communication system of the second embodiment.

FIG. 5 is an illustration of a software implementation of the second embodiment represented by a flowchart whose routine is broadly divided into a first subroutine executed by the extended application execution environment 426 and a second subroutine executed by the application execution environment 424.

The first subroutine begins with decision step 500, which determines if a communication request is issued from the application program 400. If so, flow proceeds to step 502 to suspend the execution of a communication process, which would otherwise be initiated by the communication setup means 402 in response to the communication request. At step 502, a source port number is dynamically assigned to the communication request, and flow proceeds to step 506 to determine the identity of application program 400. At step 508, the determined AID is used as a search key to search through the lookup table 414 for detecting the communication control data corresponding to the application program 400. At step 510, the communication control data associated with the program 400 is supplemented with the source port number assigned at step 504, and the supplemented control data is set into the communication control means 406 (step 512). At step 514, the execution of the communication process by the communication setup means 402 is resumed, with flow leaving the first subroutine to enter the second subroutine.

In the second subroutine, the communication setup means 402 is activated, at step 516, to initiate its communication process by formulating and forwarding packets onto the network through the communication control means 406 according to the TCP/IP or UDP/IP protocol. At step 518, the communication control means 406 performs control on the forwarded packets according to the control data already set in step 512.

Figure 6:
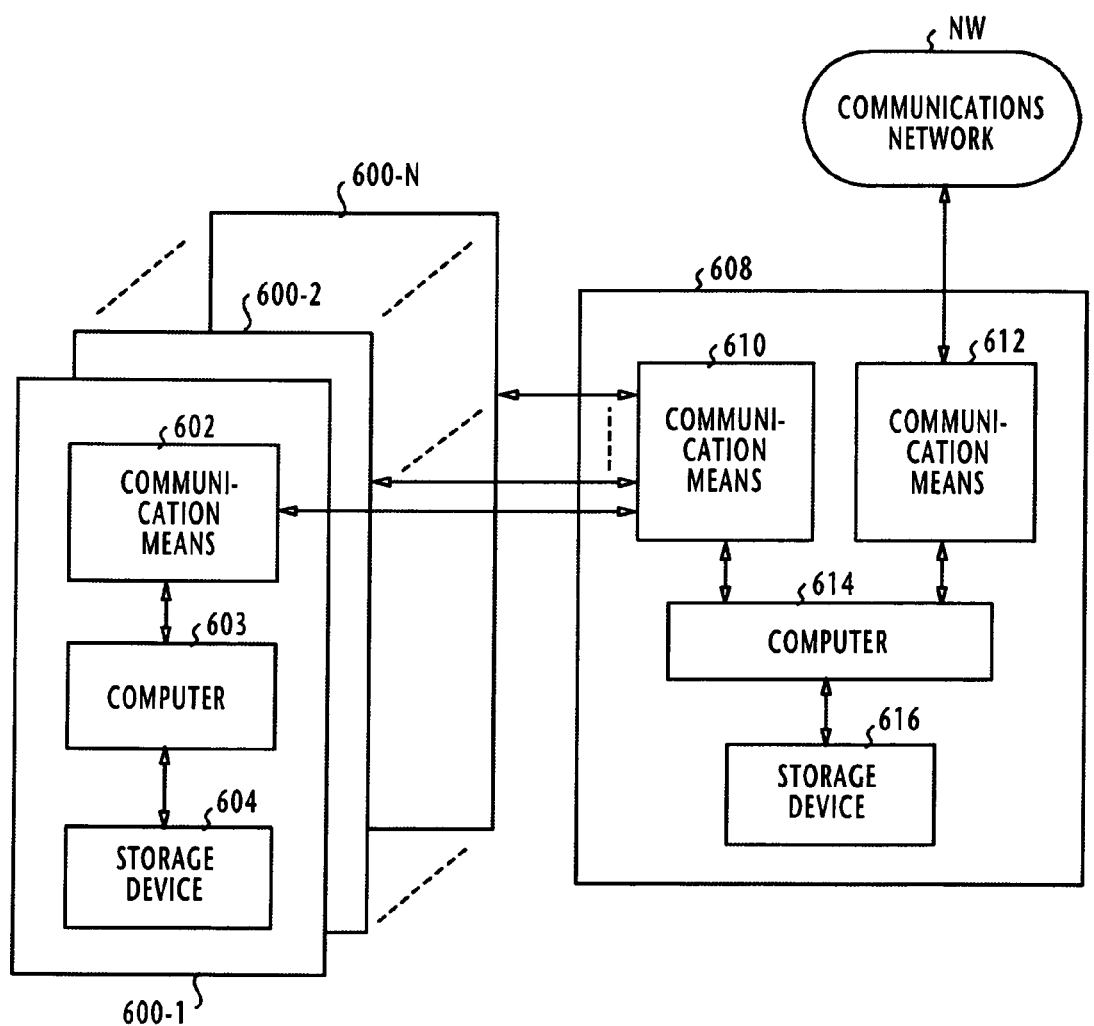
FIG. 6 is a block diagram of a distributed communication system according to a third embodiment of the present invention.
Figure 7:
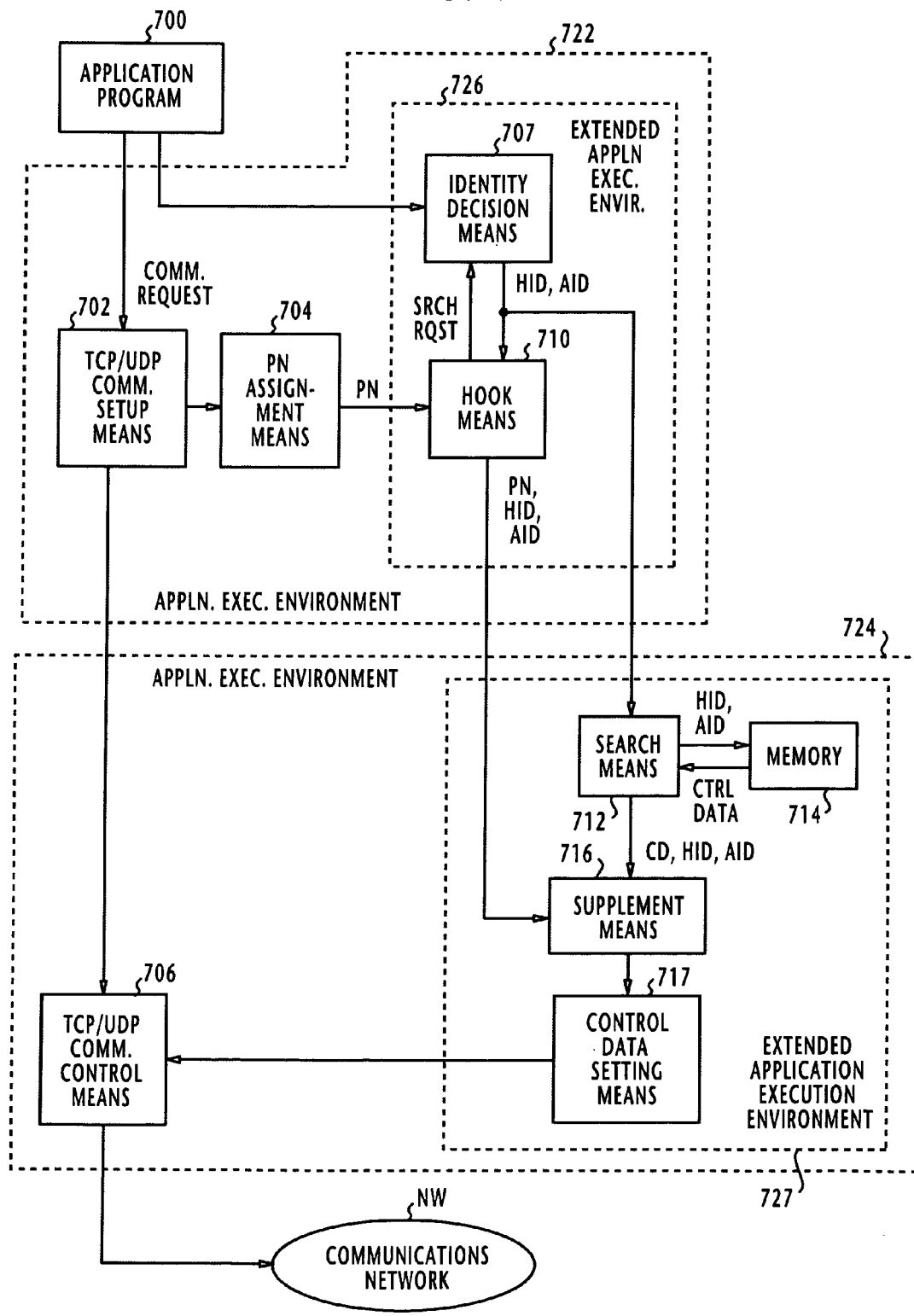
FIG. 7 is a functional block diagram of the third embodiment, which is implemented by operating the software of a third embodiment of the present invention.
Figure 8:
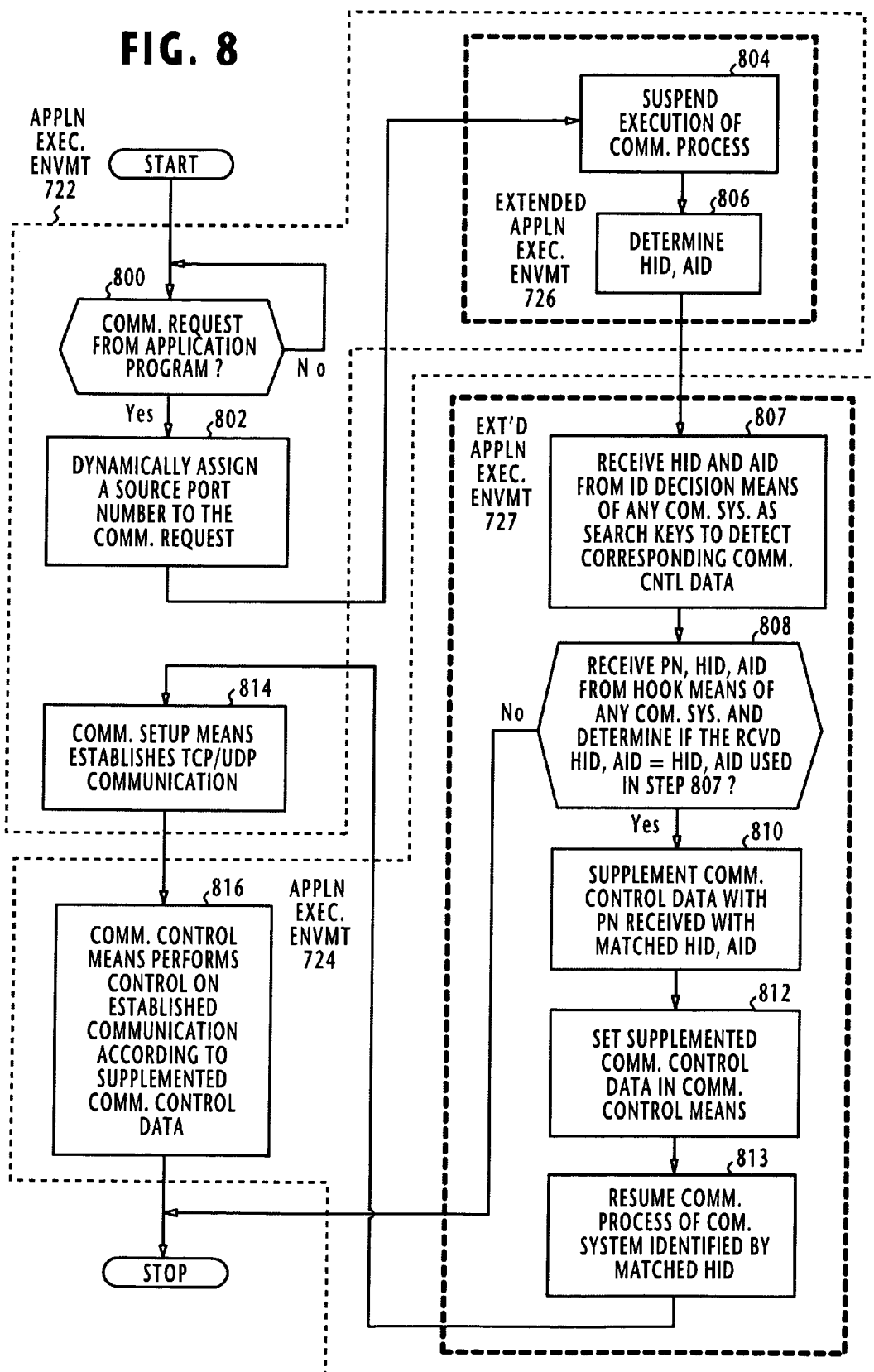
FIG. 8 is a flowchart illustrating a software implementation of the third embodiment.

A communication system according to a third embodiment of the present invention is shown in FIGS. 6 to 8. In FIG. 6, the communication system comprises a plurality of computer systems 600-1 through 600-N of similar configuration and a separate computer system, or server 608 connected to the computer systems 600-1~600-N. Server 608 is connected to the communications network NW. Each computer system 600 includes a communication means 602, a computer 603 and a storage device 604. Server 608 comprises communication means 610 and 612, a computer 614 and a storage device 616. Communication means 610 is connected to the communication means 602 of all computer systems 600-1~600-N and the communication means 612 is connected to the communications network NW. Both communication means 610 and 612 are connected to the computer 614.

FIG. 7 illustrates a hardware implementation of the third embodiment in which an application execution environment 722 is installed on the hardware of each computer system 600 and an application execution environment 724 is installed on the hardware of server 608. Since the computer systems 600 are substantially identical, discussion of only one application execution environment 722 that runs on one of the computer systems 600 as a representative will suffice, it being understood that the discussion applies to the application execution environments that run on the other computer systems 600.

Although application execution environments of the other computer systems are connected to the application execution environment 724 it may be sufficient to show only one application execution environment 722.

Application execution environment 722 includes a TCP/UDP communication setup means 702, a source port number assignment means 704, and an extended application execution environment 726, which operates during the time the communication setup means 702 is hooked in a manner described below. TCP/UDP communication setup means 702 is connected to an application program 700 that contains programmed instructions for data communication. In response to a user's communication request from the application program, requesting the establishment of a TCP/IP or UDP/IP communication with a remote terminal via the network NW, the communication setup means 702 initiates a communication process according to the TCP/IP or UDP/IP protocol and instructs the port number assignment means 704 to dynamically assign a source port number to the communication request.

Extended application execution environment 726 is comprised of an identity decision means 707 that determines the identity of the hardware on which the application program 700 is installed by analyzing the serial number of the housing in which the computer system is encased, and the identity of application program 700. The identity of the hardware can be alternatively determined by writing such serial number into the application program 700 and reading it when the identity of the application program is determined.

A hook means 710 is provided to receive the assigned source port number from the assignment means 704, the received port number being stored in memory for later use.

In a manner similar to the previous embodiments, the hook means 710 is a "CALL function" software module installed on the extended application execution environment 726. The operation of the CALL function proceeds from the communication setup means 702 through the PN assignment means 704 to the hook means 710.

On the other hand, the application execution environment 727 includes a TCP/UDP communication control means 706 connected to the TCP/UDP communication setup means 702 of each computer system, a search means 712, a memory or lookup table 714, a supplement means 716 and control data setting means 717. The CALL function of hook means 710 will proceed through the hook means 710 and supplement means 716 to the control data setting means 717 and return to the communication setup means 702.

Search means 712 is connected to the identity decision means 707 of each computer system 600 to receive its hardware identity (HID) and the application identity (AID). Lookup table 712 stores a plurality of communication control data mapped to corresponding hardware identities and corresponding application identities. Supplement means 716 is connected to the output of search means 712 and to the hook means 710 of each computer system 600.

In response to receipt of the port number, the hook means 710 instructs the communication setup means 702 to suspend its communication process. At the same time, the hook means 710 supplies a search request to the identity decision means 707.

In response to the search request from the hook means 710, the identity decision means 707 determines the HID and AID as mentioned above and supplies them to the hook means 710 and the search means 712. Using the HID and the AID as search keys, the search means 712 makes a search through a memory or lookup table 714 for detecting corresponding communication control data.

From the search means 712 the supplement means 716 receives the communication control data associated with the application program 700 and the hardware on which the environment 722 is running, and the HID and the AID. In addition, the supplement means 716 receives the assigned port number, the HID and the AID from the hook means 710. Supplement means 716 compares the HID and AID received from the search means 712 with the HID and AID received from the hook means 710. If they match, the supplement means 716 verifies that they are originated from a single communication request. If a racing condition occurs among communication requests issued simultaneously from the computer systems 600, a mismatch can occur. The above comparison can avoid mishandling of the simultaneously generated communication requests.

Since this communication control data gives no information as to source port number, the supplement means 716 supplements it with the source port number received from the hook means 710 to produce supplemented communication control data.

A control data setting means 717 receives the supplemented communication control data from the supplement means 716 and sets the received data into the TCP/UDP communication control means 706. At the same time, the control data setting means 717 communicates to the hook means 710 the fact that the PN-supplemented control data is set into the control means 706. In response the hook means 710 instructs the communication setup means 702 to resume the communication process by starting to formulate and forward packets according to the TCP/IP or UDP/IP protocol to the network through the communication control means 706.

FIG. 8 is an illustration of a software implementation of the communication system of the third embodiment. The routine begins with decision step 800 that determines if a communication request is received from the application program 700. If a communication request is received, the communication setup means 702 initiates a communication process, and flow proceeds to step 802 to dynamically assign a source port number, as a part of the communication process, to the received communication request. At step 804, the execution of the communication process is suspended. At step 806, the HID and AID are determined by the identity decision means 707 of any computer system 600.

At step 807, the search means 712 of the server 608 receives HID and PID from the identity decision means 707 of any computer system 600 and uses them as search keys to search through the lookup table 714 for detecting corresponding communication control data. At decision step 808, the supplement means 716 receives assigned port number (PN), HID and AID from the hook means 710 of any computer system 600 and compares the HID and AID received with the assigned port number with the HID and AID used in step 807 for a match or mismatch. If they do not match, flow proceeds to the end of the routine.

If the HID and AID received with the assigned port number are identical to the HID and AID of step 807, flow proceeds to step 810 to supplement the communication control data detected by step 807 with the source port number received with the matched HID and AID.

At step 812, the supplemented communication control data is set into the communication control means 706, and the execution of the communication process of the computer system 600 identified by the matched HID is resumed (step 813).

At step 814, the communication setup means 702 resumes its communication process by formulating and forwarding packets according to the TCP/IP or UDP/IP protocol through the communication control means 706 to the network NW. At step 816, the communication control means 706 performs control on the forwarded packets according to the control data already set in step 812.

The third embodiment shown in FIGS. 6 to 8 is advantageous in that, in comparison with the previous embodiments, the amount of processing load for executing the application program 700 and the amount of processing load for performing the function of the communication control means 706 are distributed among different computer systems. As a result, the individual processing burdens of the computers 603 and 614 can be reduced.

A further advantage of the third embodiment is that a single lookup table 714 can be shared among the computer systems 600-1~600-N, instead of installing separate lookup tables on the computer systems 600-1~600-N.

Figure 9:
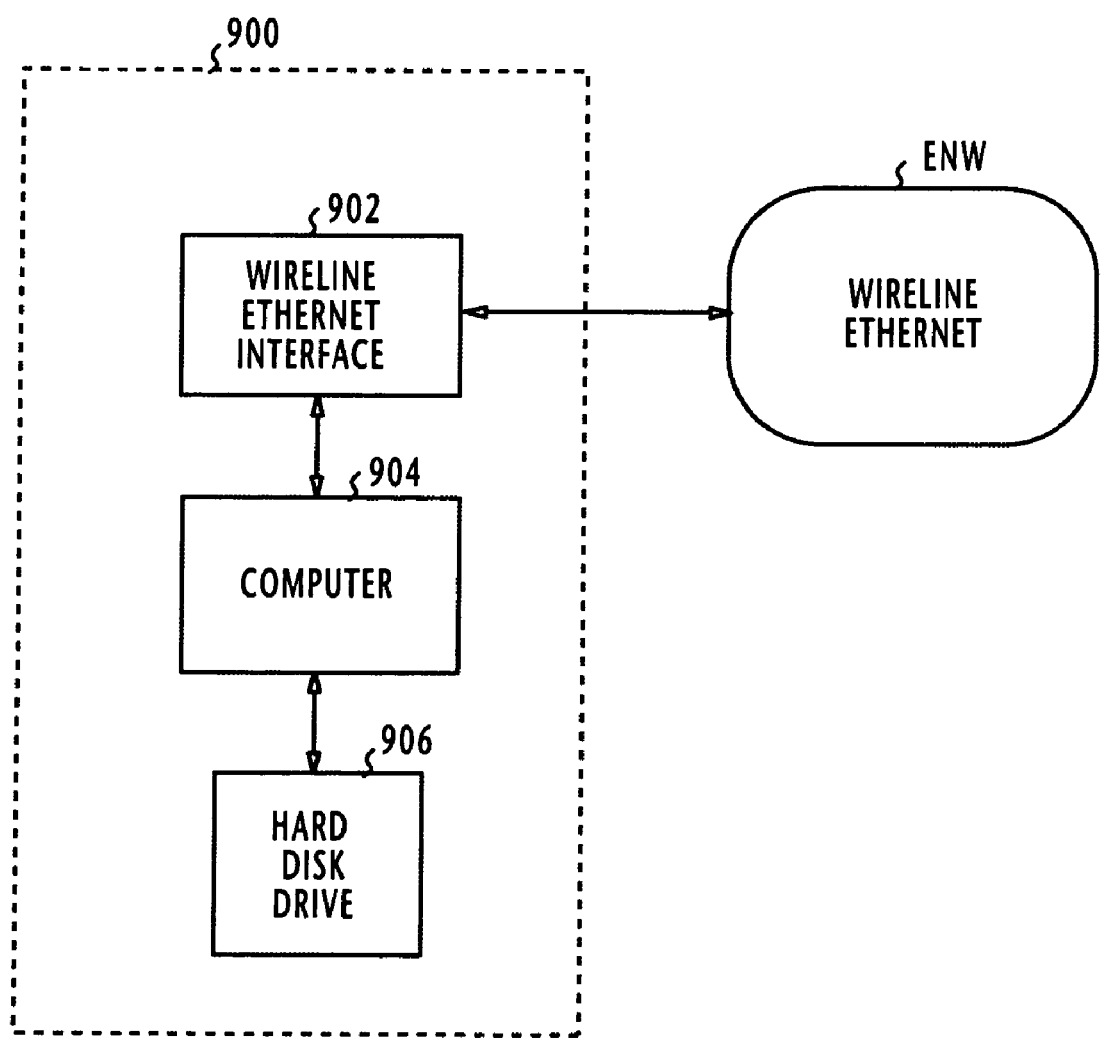
FIG. 9 is a block diagram of a communication system according to a fourth embodiment of the present invention.
Figure 10:
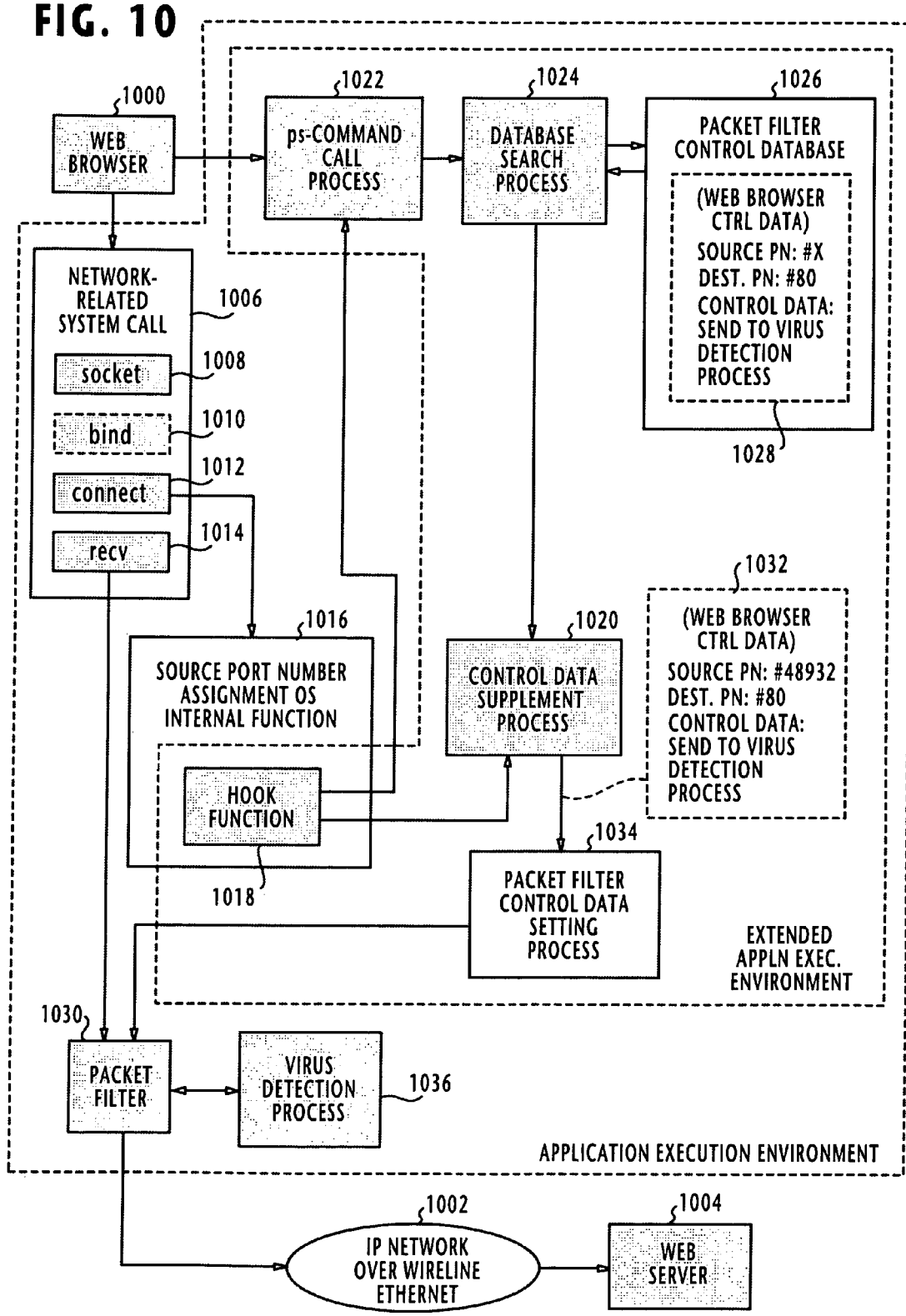
FIG. 10 is a block diagram showing details of the communication system of FIG. 9.

A fourth embodiment of the present invention is shown in FIGS. 9 and 10. In FIG. 9, the communication system comprises a communication terminal 900 including a wireline Ethernet interface 902 that interfaces the terminal 900 to a wireline Ethernet network ENW, a computer 904 and a hard disk drive 906 as an external storage device of the computer 904.

In FIG. 10, a Web browser 1000 operates an application program. As a part of its functions, the Web browser 1000 invokes a network-related system call 1006 (which is a mechanism used by an application program to request service from the Operating System) in order to establish communication through a packet filter 1030 with a remote Web server 1004 via an IP network 1002 over wireline Ethernet. If a UNIX Operating System is used, the system call 1006 includes a socket system call 1008 (formulate-a-socket request for connection to Web server 1004), a bind system call 1010, a connect system call 1012 (connection request to Web server 1004), and receive system call (data acquisition request from Web server 1004).

In a typical example, the Web browser 100 successively invokes the socket system call 1008, the connect system call 1012 and the receive system call 1014 in the order named. The bind system call 1010, whose normal function includes the ability to explicitly specify a source port number, is not invoked since the Web browser 1000 usually operates without specifying a source port number.

When the Web browser 1000 invokes the connect system call 1012, a network connection request process (i.e., the communication process) by the connect system call 1012 is performed to establish a connection to the network via the packet filter 1030 and a SPN (source port number) assignment OS internal function 1016 is called for assigning a source port number (#48932, for example) within the connect system call 1012 (depending on different Operating Systems, the OS internal function 1016 is not installed as an independent function but installed as a part of the process of other function). As a result, the communication process that begins with the operations of the network-related system call 1006 and a part of the packet filter 1030, as a communication setup means, are suspended.

The OS internal function 1016 for source port number assignment is modified to implement the present invention. More specifically, the OS internal function 1016 is modified such that a hook function 1018 is called at the instant immediately after all functions of the internal processes of SPN assignment OS internal function 1016 are performed.

Hook function 1018 hands the source port number assigned by the OS internal function 1016 to a control data supplement process 1020 for supplementing packet filter control data with the assigned port number supplied from the hook function 1018 through a process-to-process communication provided by a UNIX domain socket. Hook function 1018 obtains the process ID of the calling Web browser 1000 and hands it to a ps-command call process 1022, using a process-to-process communication of UNIX domain socket. (Note that in the UNIX Operating Systems, process IDs are used to identify running processes and such IDs can be easily obtained in the network-related system call 1006). In response to the process ID from the hook function 1018, the ps-command call process 1022 identifies the file name of the corresponding process and uses a process-to-process communication of the UNIX domain socket to hand it to a database search process 1024 that makes a search for packet filter control data.

Using the identified file name as a search key, the database search process 1024 makes a search through a packet filter control database 1026 and acquires Web browser control data 1028. Web browser control data 1028 includes a source port #X (unknown), a destination port #80, and control data specifying "send to virus detection process". Database search process 1024 uses a process-to-process communication to supply the acquired control data 1028 to control data supplement process 1020 to supplement the Web browser control data 1028 with the source port number assigned by the OS internal function 1016 to produce supplemented Web browser control data 1032, which is supplied to a packet filter control data setting process 1034 via a UNIX-domain socket's process-to-process communication. Web browser control data 1032 includes the assigned source port #48932, a destination port

80, and "send to virus detection process" control data, which is now complete for the packet filter 1030 to function properly.

Packet filter control data setting process 1034 now performs the setting of the complete Web browser control data into the packet filter 1030 by rewriting its setup file and rebooting it.

The intervening operation that started in response to the assignment of a source port number by the hook function 1018 now ends with the setting of the complete control data into the packet filter 1030. Since the network connection request process by the connect system call 1012 is complete, the communication process is resumed by the receive system call 1014 that performs a data acquisition process for receiving data from the Web server 1004. When a packet is received from the Web server 1004, the packet filter 1030 transfers the received data to virus detection process 1036 according to the supplemented control data. When the received data is checked for virus and verified, the packet filter 1030 sends the verified data to the Web browser 1000.

It is seen from the foregoing description that the TCP/IP communication can be controlled by the packet filter 1030 without modifying the Web browser 1000 and without writing a source port number into the Web browser control data 1028.

Additionally, the present invention can be used for enhancing the security of personal computers as well as mobile telephones whose software has an extendable capability. Furthermore, the present invention can also be used in applications for making a database search for synonyms and in programs for implementing an information search system in a computer.

While mention has been made of a source port number, other communication parameter such as network address could equally be as well used for application programs that do not specify such a communication parameter.

What is claimed is:

1. A communication system comprising:
    communication setup means that initiates a communication process according to a communication protocol in response to a communication request from an application program and suspends said communication process, said application program not specifying a predetermined communication parameter;
    assignment means that dynamically assigns a communication parameter as a predetermined communication parameter to said communication request;
    supplement means that supplements communication control data associated with said application program with the assigned communication parameter to generate supplemented communication control data during the time said communication process is suspended, wherein said communication control data is determined by said application program, wherein the communication control data comprises bandwidth allocation, data transfer and communication shutoff information;
    communication control means arranged to be configured with the supplemented communication control data from said supplement means,
    wherein said communication setup means resumes said communication process when said communication control means is configured with said supplemented communication control data to establish communication over a communications network,
    wherein said communication control means performs control on said established communication according to the supplemented communication control data;
    a memory that stores a lookup table which maps communication control data to application identities;
    decision means that determines the identity of said application program; and
    search means that makes a search through said memory for detecting one of the stored communication control data that is associated with the determined identity and supplies the detected communication control data to said supplement means.

2. The communication system of claim 1, wherein said communication setup means suspends said communication process when said communication parameter is assigned to said communication request.

3. The communication system of claim 1, wherein said predetermined communication parameter is a source port number of TCP/IP or UDP/IP protocol.

4. A communication system comprising:
    at least one computer system and a server connected to the at least one computer system,
    said at least one computer system comprising:
        communication setup means that initiates a communication process according to a communication protocol in response to a communication request from an application program and suspends said communication process, said application program not specifying a predetermined communication parameter; and
        assignment means that dynamically assigns a communication parameter as a predetermined communication parameter to said communication request,
    said server comprising:
        supplement means that receives said assigned communication parameter from said at least one computer system and supplements communication control data corresponding to said application program with said received communication parameter, wherein said communication control data is determined by said application program, wherein the communication control data comprises bandwidth allocation, data transfer and communication shutoff information;
        communication control means arranged to be configured with the supplemented communication control data from said supplement means,
    wherein said communication setup means of said at least one computer system resumes said communication process when said communication control means is configured with said supplemented communication control data to establish communication over a communications network,
    wherein said communication control means of said server performs control on said established communication according to the supplemented communication control data;
    a memory that stores a lookup table which maps communication control data to application identities;
    decision means that determines the identity of said application program; and
    search means that makes a search through said memory for detecting one of the stored communication control data that is associated with the determined identity and supplies the detected communication control data to said supplement means.

5. The communication system of claim 1, wherein communication control data is unique to each application program.

6. A communication system comprising:
    communication setup means that initiates a communication process according to a communication protocol in response to a communication request from an application program which does not specify a predetermined communication parameter;
assignment means that dynamically assigns a communication parameter as a predetermined communication parameter to said communication request;
hook means that causes said communication setup means to suspend said communication process in response to said communication parameter being assigned to said communication request;
supplement means that supplements communication control data associated with said application program with the assigned communication parameter to generate supplemented communication control data when said communication process is being suspended, wherein said communication control data is determined by said application program, wherein the communication control data comprises bandwidth allocation, data transfer and communication shutoff information;
communication control means arranged to be configured with the supplemented communication control data from said supplement means,
wherein said hook means causes said communication setup means to resume said communication process when said communication control means is configured with said supplemented communication control data to establish communication over a communications network,
wherein said communication control means performs control on said established communication according to the supplemented communication control data;
a memory that stores a lookup table that maps communication control data to application identities;
decision means that determines the identity of said application program; and
search means that makes a search through said memory for detecting one of the stored communication control data that is associated with the determined identity and supplies the detected communication control data to said supplement means.

7. The communication system of claim 6, wherein said assignment means dynamically assigns said communication parameter as a part of said communication process.

8. The communication system of claim 6, wherein said predetermined communication parameter is a source port number of TCP/IP or UDP/IP protocol.

9. The communication system of claim 1, or 7, wherein said communication control means comprises a packet filter.

10. The communication system of claim 4, wherein said assignment means dynamically assigns said communication parameter as a part of said communication process.

11. The communication system of claim 4, wherein said predetermined communication parameter is a source port number of TCP/IP or UDP/IP protocol.

12. A communication system comprising:
at least one computer system and a server connected to the at least one computer system,
said at least one computer system comprising:
communication setup means that initiates a communication process according to a communication protocol in response to a communication request from an application program and suspends said communication process, said application program not specifying a predetermined communication parameter;
assignment means that dynamically assigns a communication parameter as a predetermined communication parameter to said communication request; and
identity decision means that determines the hardware identity of said first computer system and the application identity of the application program of the first computer system,
said server comprising:
a memory that stores a lookup table that maps communication control data to application and hardware identities;
search means that uses the hardware and application identities determined by said at least one computer system as search keys to make a search through said memory for detecting corresponding communication control data;
supplement means that receives said hardware and application identities and said assigned communication parameter from said at least one computer system and supplements the detected communication control data with said received communication parameter if the hardware and application identities received with said communication parameter are matched to the hardware and application identities that correspond to said detected communication control data, wherein said detected communication control data is determined by said application program, wherein the communication control data comprises bandwidth allocation, data transfer and communication shutoff information; and
communication control means arranged to be configured with the supplemented communication control data from said supplement means,
wherein said communication setup means of said at least one computer system that is identified by the matched hardware identity resumes said communication process when said communication control means is configured with said supplemented communication control data to establish communication over a communications network,
wherein said communication control means of said server performs control on said established communication according to the supplemented communication control data.

13. The communication system of claim 12, wherein said assignment means dynamically assigns said communication parameter as a part of said communication process.

14. The communication system of claim 12, wherein said predetermined communication parameter is a source port number of TCP/IP or UDP/IP protocol.

15. The communication system of claim 12, wherein said communication control means comprises a packet filter.

16. A method of communication, comprising the steps of:
initiating a communication process according to a communication protocol in response to a communication request from an application program that does not specify a predetermined communication parameter;
dynamically assigning a communication parameter as a predetermined communication parameter to said communication request;
suspending said communication process;
supplementing communication control data associated with said application program with said assigned communication parameter to generate supplemented communication control data, wherein said communication control data is determined by said application program, wherein the communication control data comprises bandwidth allocation, data transfer and communication shutoff information;

resuming said communication process to establish communication over a communications network;
controlling the established communication according to said supplemented communication control data;
determining the identity of said application program; and
making a search through a lookup table which maps communication control data to application identities for detecting communication control data that corresponds to the determined identity.

17. The method of claim 16, wherein said predetermined communication parameter is a source port number of TCP/IP or UDP/IP protocol.

18. A method of communication for at least one computer system and a server connected to the at least one computer system, the method comprising the steps of:
initiating a communication process in said at least one computer system according to a communication protocol in response to a communication request from an application program which does not specify a predetermined communication parameter;
suspending, in said at least one computer system, said communication process;
dynamically assigning, in said at least one computer system, a communication parameter as a predetermined communication parameter to said communication request;
determining, in said at least one computer system, the hardware identity of said at least one computer system and the application identity of the application program of said at least one computer system;
making a search, in said server, through at least a lookup table which maps communication control data to hardware and application identities using the hardware and application identities determined by at least one computer system as search keys for detecting corresponding control data;
receiving, at said server, said hardware and application identities and said communication parameter from said at least one computer system and supplementing the detected communication control data with the received communication parameter if the hardware and application identities received with the communication parameter are identical to the hardware and application identities that correspond to said detected communication control data, wherein said detected communication control data is determined by said application program, wherein the communication control data comprises bandwidth allocation, data transfer and communication shutoff information;
resuming, in said at least one computer system, said communication process to establish communication over a communications network; and
controlling, in said server, the established communication according to the supplemented communication control data.

19. The method of claim 18, wherein said predetermined communication parameter is a source port number of TCP/IP or UDP/IP protocol.

20. A method of communication for at least one computer system and a server connected to the at least one computer system, the method comprising the steps of:
a) initiating a communication process in said at least one computer system according to a communication protocol in response to a communication request from an application program which does not specify a predetermined communication parameter;
b) suspending, in said at least one computer system, said communication process;
c) dynamically assigning, in said at least one computer system, a communication parameter as a predetermined communication parameter to said communication request;
d) determining, in said at least one computer system, the hardware identity of said at least one computer system and the application identity of the application program of said at least one computer system;
e) receiving, at said server, the hardware and application identities determined by step (d) from any of said computer systems and making a search through a lookup table which maps communication control data to hardware and application identities for detecting communication control data that corresponds to the received hardware and application identities, wherein said detected communication control data is determined by said application program, wherein the communication control data comprises bandwidth allocation, data transfer and communication shutoff information;
f) receiving, at said server, the communication parameter assigned by step (c) and the hardware and application identities determined by step (d) from said at least one computer system and supplementing the communication control data detected by step (e) with the communication parameter if the hardware and application identities received with the communication parameter are matched to the hardware and application identities that correspond to said detected communication control data;
g) resuming, in said at least one computer system that is identified by the matched hardware identity, said communication process to establish communication over a communications network; and
h) controlling, in said server, the established communication according to the supplemented communication control data.

21. The method of claim 20, wherein said predetermined communication parameter is a source port number of TCP/IP or UDP/IP protocol.

22. A non-transitory computer-readable storage medium storing a program which executes the steps of:
initiating a communication process according to a communication protocol in response to a communication request from an application program that does not specify a predetermined communication parameter;
dynamically assigning a communication parameter as a predetermined communication parameter to said communication request;
suspending said communication process;
supplementing communication control data associated with said application program with said assigned communication parameter to generate supplemented communication control data, wherein said communication control data is determined by said application program, wherein the communication control data comprises bandwidth allocation, data transfer and communication shutoff information;
resuming said communication process to establish communication over a communications network;
controlling the established communication according to said supplemented communication control data;
determining the identity of said application program; and making a search through a lookup table which maps communication control data to application identities for detecting communication control data that corresponds to the determined identity.

23. The non-transitory computer-readable storage medium of claim 22, wherein said predetermined communication parameter is a source port number of TCP/IP or UDP/IP protocol.

24. A non-transitory computer-readable storage medium storing a program that performs communication between at least one computer system and a server, said program executes the steps of:
- initiating a communication process in said at least one computer system according to a communication protocol in response to a communication request from an application program which does not specify a predetermined communication parameter;
- suspending, in said at least one computer system, said communication process;
- dynamically assigning, in said at least one computer system, a communication parameter as a predetermined communication parameter to said communication request;
- determining, in said at least one computer system, the hardware identity of said at least one computer system and the application identity of the application program of said at least one computer system;
- making a search, in said server, through a lookup table which maps communication control data to hardware and application identities using the hardware and application identities determined by at least one computer system as search keys for detecting corresponding communication control data;
- receiving, at said server, said hardware and application identities and said communication parameter from said at least one computer system and supplementing the detected communication control data with the received communication parameter if the hardware and application identities received with the communication parameter are identical to the hardware and application identities that correspond to said detected communication control data, wherein said detected communication control data is determined by said application program, wherein the communication control data comprises bandwidth allocation, data transfer and communication shutoff information;
- resuming, in said at least one computer system, said communication process to establish communication over a communications network; and
- controlling, in said server, the established communication according to the supplemented communication control data.

25. The non-transitory computer-readable storage medium of claim 24, wherein said predetermined communication parameter is a source port number of TCP/IP or UDP/IP protocol.

26. A non-transitory computer-readable storage medium storing a program that performs communication between at least one computer system and a server, said program executes the steps of:
- a) initiating a communication process in said at least one computer system according to a communication protocol in response to a communication request from an application program which does not specify a predetermined communication parameter;
- b) suspending, in said at least one computer system, said communication process;
- c) dynamically assigning, in said at least one computer system, a communication parameter as a predetermined communication parameter to said communication request;
- d) determining, in said at least one computer system, the hardware identity of said at least one computer system and the application identity of the application program of said at least one computer system;
- e) receiving, at said server, the hardware and application identities determined by step (d) from any of said computer systems and making a search through a lookup table which maps communication control data to hardware and application identities for detecting communication control data that corresponds to the received hardware and application identities;
- f) receiving, at said server, the communication parameter assigned by step (c) and the hardware and application identities determined by step (d) from said at least one computer system and supplementing the communication control data detected by step (e) with the communication parameter if the hardware and application identities received with the communication parameter are matched to the hardware and application identities that correspond to said detected communication control data, wherein said detected communication control data is determined by said application program, wherein the communication control data comprises bandwidth allocation, data transfer and communication shutoff information;
- g) resuming, in said at least one computer system that is identified by the matched hardware identity, said communication process to establish communication over a communications network; and
- h) controlling, in said server, the established communication according to the supplemented communication control data.

27. The non-transitory computer-readable storage medium of claim 26, wherein said predetermined communication parameter is a source port number of TCP/IP or UDP/IP protocol.

28. A communication system comprising:
- communication setup means that initiates a communication process according to a communication protocol in response to a communication request from an application program and suspends said communication process, said application program not specifying a predetermined communication parameter;
- assignment means that dynamically assigns a communication parameter as a predetermined communication parameter to said communication request;
- supplement means that supplements communication control data associated with said application program with the assigned communication parameter to generate supplemented communication control data during the time said communication process is suspended, wherein said communication control data is determined by said application program, wherein the communication control data comprises bandwidth allocation, data transfer and communication shutoff information; and
- communication control means arranged to be configured with the supplemented communication control data from said supplement means,
- wherein said communication setup means resumes said communication process when said communication control means is configured with said supplemented communication control data to establish communication over a communications network, wherein said communication control means performs control on said established communication according to the supplemented communication control data, wherein communication control data is unique to each application program.

29. A communication system comprising:

communication setup means that initiates a communication process according to a communication protocol in response to a communication request from an application program and suspends said communication process, said application program not specifying a predetermined communication parameter;

assignment means that dynamically assigns a communication parameter as a predetermined communication parameter to said communication request;

supplement means that supplements communication control data associated with said application program with the assigned communication parameter to generate supplemented communication control data during the time said communication process is suspended, wherein said communication control data is determined by said application program, wherein the communication control data comprises bandwidth allocation, data transfer and communication shutoff information; and communication control means arranged to be configured with the supplemented communication control data from said supplement means, wherein said communication setup means resumes said communication process when said communication control means is configured with said supplemented communication control data to establish communication over a communications network, wherein said communication control means performs control on said established communication according to the supplemented communication control data, wherein the communication control data comprises bandwidth allocation, data transfer and communication shutoff information.

* * * * *